UNITED STATES PATENT OFFICE.

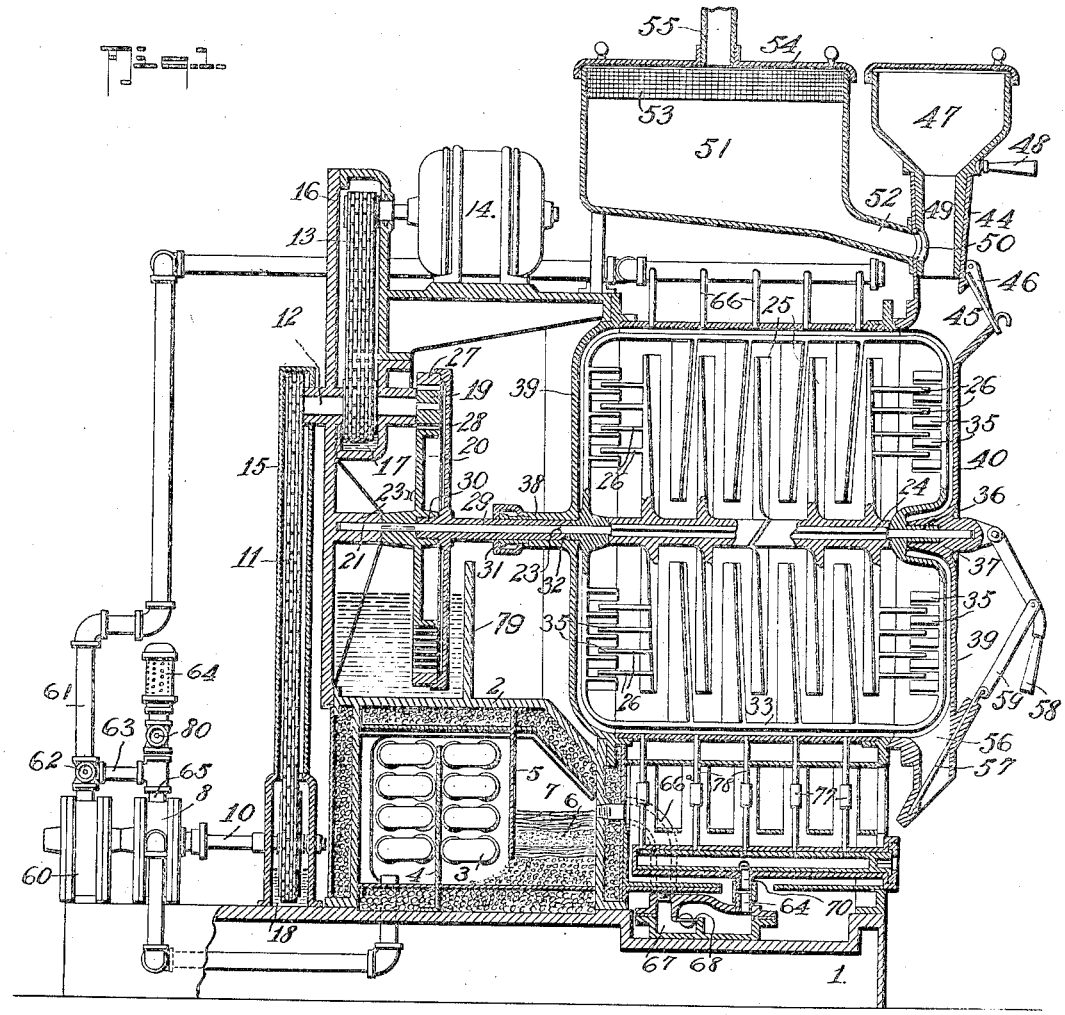

JACOB G. PECK, OF PORTLAND, OREGON.

METHOD OF FREEZING ICE CREAM.

1,408,774. Specification of Letters Patent. Patented Mar. 7, 1922.

Original application filed October 16, 1920, Serial No. 417,415. Divided and this application filed June 20, 1921. Serial No. 479,043.

*To all whom it may concern:*

Be it known that I, JACOB G. PECK, a citizen of the United States, residing at Portland, in the county of Multnomah and State of Oregon, have invented a new and Improved Method of Freezing Ice Cream, of which the following is a specification.

My invention relates to a certain new and useful method of freezing ice cream mix. According to the present almost universal practice of manufacturing ice cream on a commercial scale, the mix is put into freezers of generally not over ten gallons capacity; the freezer is cylindrical in form, surrounded by a jacket which is insulated and the refrigerated brine is circulated trough the jacket around the cylinder which brings the temperature of the cylinder below the freezing point. Inside of the cylinder is a dasher which throws the mix against the inside cold cylinder walls causing the mix to freeze on the walls, and knives attached to the dasher scrape the frozen cream from the cylinder walls and for a period of about fifteen minutes all of the ice cream mix is frozen to a temperature of about twenty-seven degrees when it is drawn off into receptacles and placed in a refrigerating room of about zero temperature to be frozen hard.

It is necessary in freezing ice cream to increase the volume of the mix by freezing and whipping to make it edible, otherwise it would be soggy and unpalatable. By the system of freezing now generally in use, it is difficult to maintain an even over-run which is necessary to make a smooth product, because the ice cream is not frozen uniformly but frozen mix is scraped from the walls of the cylinder and mixed with unfrozen mix until it is all considered frozen but this takes some time and considerable dashing and whipping. In freezing and whipping mix under the methods at present in use, the mix naturally absorbs a certain amount of air, which air is not purified but is germ and dust ladened air that is contained in the room where the workmen are employed.

My present invention has for an object to provide a method of freezing the ice cream which will avoid the objectionable features of present practice and to that end the invention resides in injecting refrigerated pure air directly into the mix (either with or without the aid of other refrigerated processes now used) and at the same time drawing off air from the interior of the cylinder to be further refrigerated and purified and returned to the mix, if desired, or a continuous stream of fresh air may be forced into the mix and the air may be exhausted from the mix and discharged to atmosphere.

The present application is a division of my application filed October 16, 1920, Serial No. 417,415, which application was originally filed to cover this process and the novel apparatus used in carrying it out but has been now confined to the apparatus alone.

In carrying out my invention, I prefer to employ the novel apparatus disclosed in my original application aforesaid, such apparatus consisting generally of a cylinder with a detachable head through which the mix is introduced into and discharged from the cylinder, a set of dashers being provided for rotation within the cylinder in opposite directions, the dashers being driven from a suitable motor through a suitable gear chain, which also drives the air pump or pumps for forcing air through a refrigerating and purifying chamber into the cylinder and mix and for withdrawing air from the cylinder after it has performed its function.

This apparatus is illustrated in the accompanying drawing, in which:

Figure 1 is a central vertical longitudinal section of the same.

Figure 2 is an enlarged detail view of one of the air controlling valves.

Figure 3 is a cross section of the same on the line 3—3 of Figure 2.

In the drawing in which like numerals of reference indicate like parts in all of the figures, 1 is the base on which may be mounted the refrigerating and purifying chamber 2 which contains the brine circulating coils 3 and the air circulating partitions 4 and 5, together with the purifying filter 6, 7 being a collection space for the purified air.

8 is the air pump which draws pure air through a strainer 64 or draws air from the suction duct 61 via the three-way valve 62, pass 63 and pipe 65, when the shut off valve 80 is closed.

10 is the drive shaft for the pumps which is driven by a silent chain 11 from a countershaft 12 that is in turn driven through a silent chain drive 13 by the motor 14, the chain drives 11 and 13 being encased at 15 and 16 and run in oil baths 18 and 17 respectively.

19 is a pinion on the shaft 12 which meshes with an external gear 20 that is keyed to a stub shaft 21 which has a separable joint 23 with the dasher shaft 24 on which the central dasher is placed, the dasher including radial blades 25 and circumferential blades 26, the latter cooperating with the corresponding blades 35 of the outer dasher 33.

27 is an internal gear which meshes with the pinion 19 and is carried on a disk 28 whose hub 29 has a bearing at 30 in the hub of the gear 20 and which turns on the stub shaft 21, the stub shaft being itself journaled in a bearing 23ˣ on the support.

31 is a stuffing box on the boss 38 of the cylinder 39 through which the sleeve 29 passes, the sleeve 29 being journaled in the boss 38 and having a separable connection 32 with the dasher 33. The dasher 33 has a front hub 36 which forms a bearing for the shaft 24 of the central dasher and which has its bearing in the bearing 37 of the head 40 of the cylinder. The cylinder is provided with a flange and the cylinder and head are secured together detachably in any desired manner.

44 is a frusto-conical neck which delivers, through an opening in the head 40, the mix to the cylinder.

The throat 44 receives the spout 49 of a funnel 47 which is provided with a handle 48 and a port 50 which registers with the discharge end 52 of the mix receiver 51 so that by turning the funnel 47 through the medium of the handle 48, the port 50 will register with or close the outlet of the spout 52.

45 is an opening closed by a cover 46 which may be used as a peep hole, if desired, or through which coloring matter or flavoring extracts may be admitted into the mix or samples of the mix may be taken out. The funnel 47 may also be used for the introduction of flavoring extracts or part of the ingredients of the mix in the cylinder.

53 is a strainer in the mix receiver 51, the latter being covered at 54 and the mix being introduced through the duct 55 from the mixing machine (not shown).

56 is the outlet from the cylinder which is provided in the cylinder head and is controlled by a gate valve 57 that is operated by the lever 58 through the link connection 59.

60 is an air suction pump delivering to atmosphere and coupled with the duct 61, the pump 60 being adapted to create a suction in the cylinder 39 by means of branches 66 which connects the duct with the interior of the cylinder at the top. The pump 60 may be mounted on the same shaft as the pump 8 and driven by the same driving mechanism therefor, if desired.

66ª is a duct which conveys refrigerated and purified air from the chamber 7 to the chamber 67 of the valve mechanism 68, from which it is passed through the discharge duct 64 and duct 70 into the interior of a hollow cylindrical valve 72 which has provision at 73 for the insertion of a square instrument by which the valve may be turned for regulating purposes.

The valve has V-shaped openings 74 registering with the entrances 75 of the air injecting pipes or nozzles 76, the latter being connected by separable connections 77 with the ducts 78 that lead into the interior of the cylinder.

79 is a wall which acts as a dam for the lubricant in which the gears 20 and 27 run.

If desired, the cylinder 39 may be provided with a heat insulating jacket or it may be provided with a jacket through which brine may be circulated to assist in cooling or chilling the mix.

In practice, the mix is introduced into the receiver 51 and allowed to flow down into the cylinder 39, where it is encountered by the dashers and rapidly agitated to cause the same to be aerated and to swell. At the same time, the pump 8 forces air through the duct 9 and through the cooling and purifying unit 2 and branches 66, etc. to the valve 72, by which it is distributed to the various laterals 76 which deliver the air through the duct 78 into the interior of the cylinder, where it is forced through the mix. At the same time, a partial vacuum is produced at the top of the same by the suction created in the duct 61, either by the pump 60 or when the return circulation is employed, then by the pump 8.

It will thus be seen that the pure cool air in passing through the mix, not only refrigerates it but removes the impurities as well.

While I have illustrated a preferred embodiment of the apparatus which can be used to perform my process, I desire it understood that I do not limit the use of my process to such apparatus.

What I claim is:

1. A process of freezing ice cream, which consists in placing the mix in a cylinder or container, forming a partial vacuum at the top of the container by withdrawing the air from the same and forcing refrigerated air into the same at the bottom of the mix.

2. The method of freezing ice cream, which consists in placing the ice cream in a container, agitating the contents of the container, and simultaneously forcing refrigerated air into the bottom of the container and sucking air out of the top of the container.

3. The method of freezing and purifying ice cream mix which consists in enclosing the mix in a substantially closed container and causing a continuous circulation of air in a closed circuit through the mix and simultaneously refrigerating and purifying the circulating air.

4. The process of freezing ice cream mix which consists in enclosing the mix in a container, creating a partial vacuum at one part of the container and introducing refrigerated air into the container at another place while agitating the mix.

5. The method of refrigerating fluid mass which consists in placing the mass in a container, forming a partial vacuum at one place in the container and forcing or admitting refrigerated air into the container at another place.

6. The method of refrigerating the fluid ingredients used in the manufacture of ice cream, which consists in placing the same in a container of larger volume than the initial volume of the fluid ingredient used, removing air from one place in the container and introducing refrigerated air at another place thereby refrigerating the mass and causing it to swell.

7. The method of refrigerating the fluid ingredients used in the manufacture of ice cream, which consists in placing the same in a container, creating a partial vacuum at one part of the container and introducing refrigerated air into the container at another place while agitating the contents of the container.

JACOB G. PECK.